April 7, 1964 R. W. JONES 3,128,392

BACK VOLTAGE LIMITING CIRCUIT

Filed Jan. 30, 1959

INVENTOR
RICHARD W. JONES

BY Ralph R Barnard
ATTORNEY

United States Patent Office 3,128,392
Patented Apr. 7, 1964

3,128,392
BACK VOLTAGE LIMITING CIRCUIT

Richard W. Jones, Apalachin, N.Y., assignor to International Business Machines Corporation, New York, N.Y., a corporation of New York Filed Jan. 30, 1959, Ser. No. 790,224
2 Claims. (Cl. 307—88.5)

Figure 2:
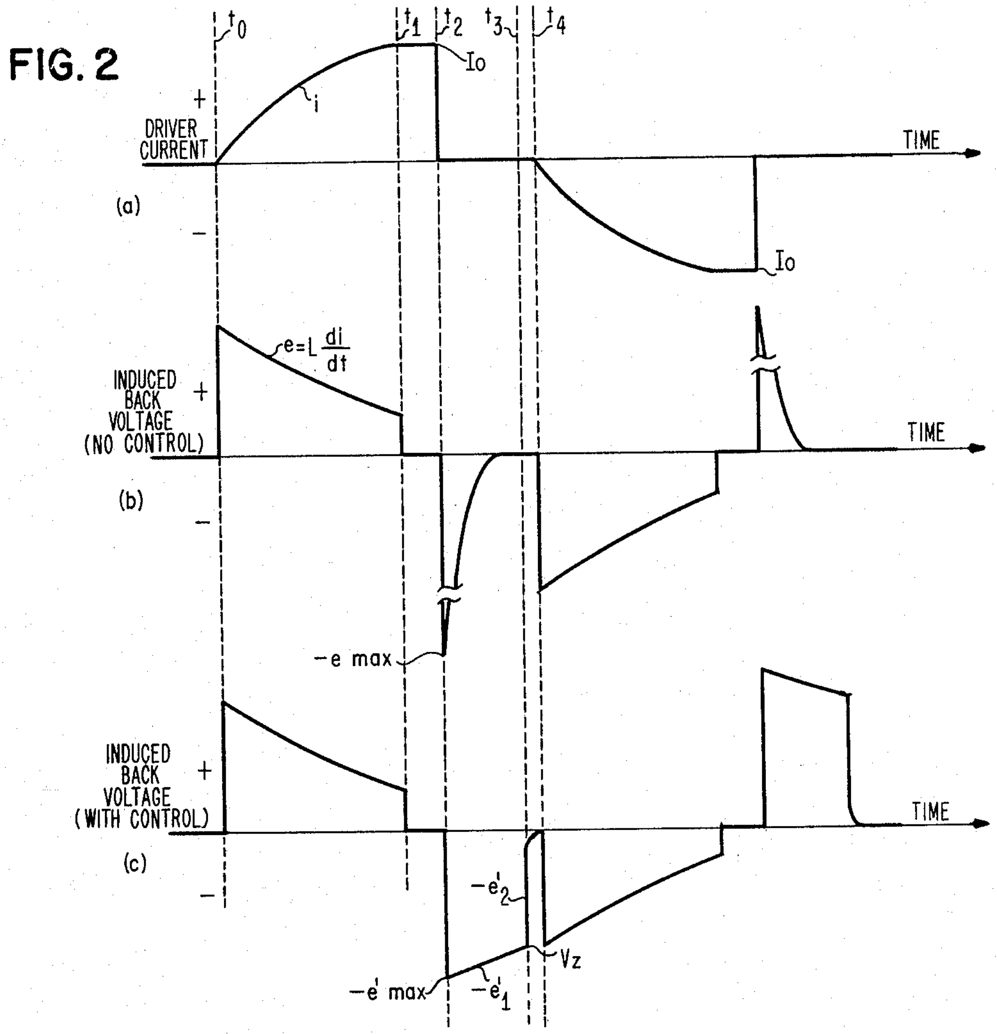

This invention relates to an electrical waveform control system for an inductive load and more particularly, it relates to a new and improved means for controlling the maximum induced voltage and the maximum recovery time period of the voltage waveform across an inductive load being energized by a source having a current waveform including a high slope followed by a low or zero slope to allow for recovery.

In the instrumentation of electrical computers and electronic display devices, it is often desired to apply a current waveform to an inductive load by a current driver. For example, a current pulse may be passed through an inductive relay coil in computer circuitry. In cathode ray tube display applications, driver currents with a saw-tooth waveform or similar waveform are often applied to inductive sweep circuits. It will be noted that these current waveforms have high slopes followed by a zero or nearly a zero slope.

In cathode ray tube deflection systems, the current driver and deflection coils are often critically damped (or approximately so) in order that the current waveform in the inductive load have a similar or identical waveform with that of the driver. As a result of this critical damping, the trailing edge of the current saw-tooth waveform of the driver has a rate of change of the current which is high enough that the back voltage or counter electromotive force developed across the inductive deflection coil is very large and the current driver is subjected to a large inverse voltage. This is particularly a problem when the current driver utilizes semi-conductors inasmuch as semi-conductors by their nature are more subject to back-bias breakdown than electron tubes. In addition to the back-bias breakdown of the active elements of the driver, this large back voltage may also cause an objectionable power dissipation therein and an insulation breakdown between the windings of the inductive sweep circuit. A similar problem exists when a semi-conductor driver is utilized to pass a rectangular current waveform through an inductive load. The point in time when this back voltage is completely dissipated is known as "recovery time," while the period of time required for the complete dissipation is known as the "recovery time period."

Following the high slope in the trailing edge of the saw-tooth current waveform applied by the driver, a time period characterized by a substantially zero slope is usually provided for the very high transient back voltage to be dissipated. The amount of time which may be made available for this purpose is in turn determined by the repetition rate or frequency of the saw-tooth waveform applied by the current driver. In the electrical design of the circuits, it would be desirable if means could be provided to limit the magnitude of the maximum back voltage produced by the high slopes at the leading and/or trailing edge of a rectangular or saw-tooth current waveforme applied by a driver and at the same time, utilize the maximum time for recovery provided by the particular characteristics (repetition rate) of the current waveform source.

Accordingly, the present invention teaches a technique for placing a control circuit in parallel with a critically damped inductive electrical load, such as deflection circuit, for the purpose of modifying the circuit parameters and overdamping the load when the slope of the waveform (characterizing the leading and/or trailing edge) exceeds a selected value. For this purpose, the control circuit utilizes two diodes in series with a control resistor of a particular magnitude. If the deflection current driver waveform is unipolar, one of these diodes should be of the Zener type. If the deflection current driver waveform is of the bipolar type, both of these diodes should be of the Zener type. Moreover, the breakdown voltage of each Zener diode and the magnitude of the control resistance may be selected so as to determine the maximum back voltage which is derived in the inductive load and the maximum recovery time period required. This maximum back voltage should not be sufficient to dangerously back-bias the semi-conductors in the driver and the "recovery time period" should not exceed the time available for recovery.

It is, therefore, a primary object of the present invention to provide a new and improved electrical waveform control system for an inductive load.

It is an additional object of the present invention to provide a new and improved means for controlling the maximum induced voltage and the maximum recovery time period of the voltage waveform across an inductive load being energized by a source having a current waveform including a high slope followed by a low or zero slope to allow for recovery.

It is another object of the present invention to provide a new and improved means for controlling the maximum back voltage induced in an inductive load and the recovery time period of the voltage waveform across the inductive load as a result of the trailing edge of a saw-tooth current waveform being passed therethrough.

It is still another object of the present invention to provide a new and improved electrical waveform control system for critically damping an inductive electrical load as long as the slope or rate of change of the current waveform being applied thereto by a driver is below a selected value and overdamping the load when the slope of the current waveform exceeds that selected value.

Other objects of the invention will be pointed out in the following description and claims and illustrated in the accompanying drawings which disclose, by way of examples, the principle of the invention and the best mode which has been contemplated of applying that principle.

Figure 1:
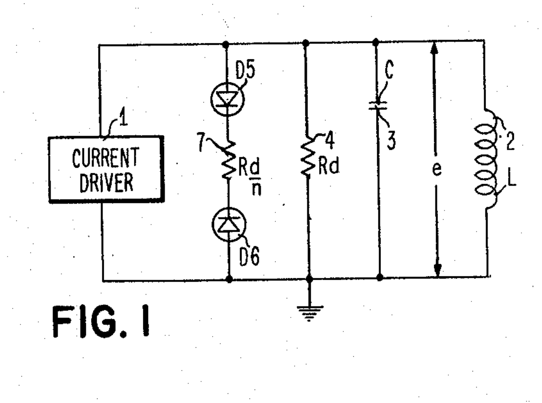

In the drawings:

FIG. 1 shows an electrical schematic of an electrical waveform control system for an inductive load in accordance with the present invention;

FIG. 2*a* shows an electrical waveform illustrating an exemplary current waveform which it is desired to pass through an inductive load such as a deflection coil;

FIG. 2*b* shows an electrical waveform of the back voltage induced across the inductive load by the current waveform of FIG. 2*a* when the load is critically damped in accordance with the prior art; and FIG. 2*c* shows an electrical waveform of the induced back voltage across the inductive load when the load is ultimately critically damped and overdamped in accordance with the present invention.

Referring to the details of FIG. 1, current driver 1 provides a saw-tooth current waveform (or an approximation thereof) to be applied across the inductive load represented by coil 2. In a practical application, coil 2 might be a deflection coil of a cathode ray tube display system. Since such a deflection coil will also have capacitance between its turns, capacitor 3 is shown connected in parallel with coil 2 so as to represent the electrical equivalent thereof. Because it is desired that the current passing through coil 2 have substantially the same waveform as the current driver, further means such as parallel resistor 4 may be connected in parallel therewith for the purpose of critically damping this potentially oscillatory electrical circuit. Damping resistor 4 will hereinafter also be referred to as R*d*. As those skilled in the art will recognize, the value of damping resistor R*d* is a function of the inductance of coil 2 and the capacitance of capacitor 3. This relationship is shown by the following equation:

$$Rd=\tfrac{1}{2}\sqrt{\frac{L}{C}} \qquad (1)$$

where L equals the inductance of coil 2 and C equals the capacitance of capacitor 3.

As a result of the critical damping provided by resistor R*d*, when an approximately saw-tooth current waveform such as that shown in FIG. 2*a* is applied to the electrical load comprising coil 2 and capacitor 3, the back voltage induced therein will have a waveform similar to that shown in FIG. 2*b*. As those skilled in the are will recognize, this induced voltage may be represented by the following equation:

$$e=L\frac{di}{dt} \qquad (2)$$

where $$\frac{di}{dt}$$

represents the slope, the current waveform and the instantaneous rate of change of the current provided by current driver 1.

At time *t*, corresponding to the trailing edge of the current waveform the $$\frac{di}{dt}$$

term (slope) is very high and a very high back voltage shown in FIG. 2*b* is induced across the load. The maximum back voltage is defined (neglecting the effect of capacitor 3) as approximately:

$$-e\ \text{max.}=-I_0Rd \qquad (3)$$

where $I_0$ is the current level of the driver just prior to time $t_2$.

Moreover, in accordance with conventional transient analysis, this maximum back voltage will decay (be dissipated) according to the following relationship:

$$-e=-I_0Rd\epsilon^{-\frac{t-t_2}{2\sqrt{LC}}} \qquad (4)$$

where *t* is the instantaneous time.

Since the magnitude of damping resistor R*d* has been selected to provide critical or approximately critical damping, this undesired transient is dissipated as quickly as possible well within the time allowed by the driver current waveform for recovery. However, as indicated hereinabove, the maximum back voltage often exceeds the safe back-biasing level of the current driver, adversely increases the power dissipation requirement thereof and causes insulation breakdown in the deflection coil.

In order to prevent this large back voltage, a control circuit is connected in parallel with damping resistor R*d* and the inductive load. As shown in FIG. 1, this control circuit comprises a series connection of diodes D5 and D6 and control resistor 7. It should be noted that diodes D5 and D6 are each oppositely oriented with respect to the other. Diode D6 should have a back breakdown voltage which is greater than that of the back voltage derived by the leading edge of the saw-tooth current waveform in accordance with Equation 2. This safe induced back voltage level is shown in FIG. 2*b* between times $t_0$ and $t_1$.

Hence, during the portion of the current waveform between times $t_0$ and $t_2$, diode D6 should have a high back resistance which is large enough (compared with resistor R*d*) so that the control circuit does not alter the critical damping of the inductive load. Accordingly, the desired current waveform is derived in the inductive load. However, the trailing edge of the driver current waveform will derive a large back voltage which will forward bias diode D6 and back bias diode D5 beyond its breakdown so that the control resistance of resistor 7 is placed in parallel with the damping resistor R*d* and the inductive load. If the magnitude of the control resistor 7 is equal to the resistor R*d* divided by a factor N of 10 or more, that resistance $$\frac{Rd}{N}$$

is effective in determining the damping of the inductive load and not resistor 4 having a resistance of R*d*.

If diode D5 is of the well-known Zener type, its breakdown voltage V*z* can be selected with great accuracy and its resistance after breakdown can be made very low. This choice of the breakdown voltage V*z* of Zener diode D5 cannot be made without regard for the time allowed for the recovery of the circuit from the transient voltage because the maximum recovery time period is determined by V*z*. This is based on the fact that when the control circuit is effective, following Zener breakdown, to modify the damping of the electrical load, the maximum back voltage *e'* max. across the load may be approximately represented by the expression:

$$e'\ \text{max.}=\frac{I_0Rd}{N+1}+Vz \qquad (5)$$

where V*z* is the breakdown voltage of Zener diode D5. Moreover, the decay of this back voltage while Zener diode D5 remains in breakdown may be approximately represented by the expression:

$$e'_1\cong\frac{I_0Rd}{N+1}+Vz\epsilon^{-\frac{Rd(t-t_2)}{L(N+1)}} \qquad (6)$$

After the back voltage has decayed or been dissipated to a voltage level equal to V*z*, the decay may be represented by the following equation:

$$e'_2=Vz\epsilon^{-\frac{t-t_3}{2\sqrt{LC}}} \qquad (7)$$

The maximum back voltage and two back voltage decay curves represented by Equations 5, 6 and 7 are shown in FIG. 2*c*.

An inspection of each of the equations indicates that when the control circuit is effective, the maximum back voltage *e'* max. is a function of both breakdown voltage of Zener diode D5 and the magnitude of the control resistance $$\frac{Rd}{N}$$

of resistor 4. Moreover, the rate at which this maximum back voltage *e'* max. decays to a voltage level equal to V*z* is also a function of both that voltage level and the magnitude of the control resistance $$\frac{Rd}{N}$$

of resistor 4.

Thus, the optimum utilization of the time allowed in the driver current waveform between $t_3$ and $t_2$ can be obtained by making a compromise between the selection of V*z* and R*d*. This compromise can be illustrated by the following approximation:

$$t_3-t_2=\frac{L(N+1)}{Rd}\left[\sqrt{1+\frac{2I_0Rd}{Vz(N+1)}}-1\right] \qquad (8)$$

If the resistance $$\frac{Rd}{N}$$

of resistor 4 is made small to aid in reducing the maximum back voltage *e'* max. according to Equation 5, $t_3—t_2$ (representing the approximate time required for the inductive load to recover) is greater, and the recovery time may exceed the time $t_4—t_2$ allowed in the driver current waveform for that purpose as shown in FIG. 2c. Similarly, if the reverse breakdown voltage Vz of Zener diode D5 is made small to lower the maximum back voltage $e'$ max., $t_3—t_2$ (representing the approximate time required for the inductive load to recover) is also made greater, and the time $t_4—t_2$ available for recovery may be exceeded. Hence, the selection of these two circuit parameters Vz and $$\frac{Rd}{N}$$

requires an optimum engineering compromise between the maximum back voltage derived by the inductive load as a result of the high slope of a current waveform and the recovery time period, which may be utilized for this maximum back voltage to decay.

Notwithstanding the above, the breakdown voltage of diode D6 must not be selected to have magnitude low enough that the slope of the portion of the current waveform and resulting induced voltage between times $t_0—t_2$ will not be sufficient to cause the control circuit to alter the circuit damping. Otherwise, the desired current waveform within the deflection coil 2 will not be obtained.

Simply stated, the present invention provides means for substantially critically damping the inductive load for current slopes as represented by the current waveform of FIG. 2a between times $t_0$ and $t_1$ and for overdamping for extremely high current slopes as represented by the current waveform at time $t_2$. When resistor 4 provides the damping, the circuit is critically damped. However, when resistor 7 provides the damping, the circuit is overdamped. Resistor 4 is effective between times $t_0$ and $t_2$ while resistor 7 is effective between times $t_2$ and $t_3$.

When the driver current waveform is unipolar, as exemplified by that portion of FIG. 2a between times $t_0$ and $t_4$, diode D5 should be of the Zener type and diode D6 may be of the conventional type. However, if the driver current waveform is bipolar and also goes negative, as exemplified by that portion of FIG. 2a subsequent to $t_4$, diode D6 should also be of the Zener type so that the induced back voltage across the inductive load is maintained at a reasonable maximum level in response to the positive going trailing edge of the driver current waveform and a desirable recovery time period is obtained in the same manner as described hereinabove. When the driver current waveform is bipolar, as shown in FIG. 2a, the back breakdown voltage Vz of each Zener diode should ordinarily be made equal.

While the teachings of the present invention have been described as applied to a saw-tooth or approximately a saw-tooth current waveform which it is desired to pass through an inductive load, it should be understood that the invention is equally applicable to other current waveforms.

While there have been shown and described and pointed out the fundamental novel features of the invention as applied to a preferred embodiment along with several specific modifications, it will be understood that many additional omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An electrical inductive load control system comprising a source of electrical power having a current waveform with various rates of change of current with time, an inductive electrical load connected to be energized by said source, a damping resistance connected in parallel with said electrical load, a control circuit connected in parallel with said electrical load and said damping resistance, said control circuit comprising first and second Zener diodes connected in series with a control resistance, said first and second Zener diodes being oriented in opposite directions, the magnitude of said damping resistance being selected to critically damp the induced voltage waveform in said inductive load, the magnitude of the reverse bias breakdown voltage of the Zener diodes and the magnitude of said control resistance being selected to limit the maximum induced voltage in said inductive load and limit the recovery time period required for the current in the load to follow the input current waveform by overdamping the inductive load when the rate of change of current of the source exceeds a selected value.

2. An electrical inductive load control system comprising a source of electrical power having a current waveform with various rates of change of current with time, an inductive electrical load connected to be energized by said source, a damping resistance connected in parallel with said electrical load, a control circuit connected in parallel with said electrical load and said damping resistance, said control circuit comprising first and second Zener diodes connected in series with a control resistance, said first and second Zener diodes being oriented in opposite directions, the magnitude of said damping resistance being selected to substantially critically damp the induced voltage waveform in said inductive load, the magnitude of the reverse bias breakdown voltage of the Zener diodes and the magnitude of said control resistance being selected to limit the maximum induced voltage in said inductive load and limit the recovery time period required for the current in the load to follow the input current waveform by increasing the damping of the inductive load when the rate of change of current of the source exceeds a selected value.

References Cited in the file of this patent

UNITED STATES PATENTS

| | | |
|---|---|---|
| 2,594,336 | Mohr | Apr. 29, 1952 |
| 2,760,109 | Schade | Aug. 21, 1956 |
| 2,774,866 | Burger | Dec. 18, 1956 |
| 2,789,254 | Bodle et al. | Apr. 16, 1957 |
| 2,854,651 | Kircher | Sept. 30, 1958 |
| 2,914,683 | Terry | Nov. 24, 1959 |
| 2,937,341 | Aram | May 17, 1960 |

OTHER REFERENCES

"Zener Diodes Stabilize Heater Voltage," by Toback, Electronics Industries, December 1958, pages 64–66.

"Germanium Crystal Diodes," by Cornelius, Electronics, February 1946, pages 118–123.